United States Patent
DeRocher et al.

(10) Patent No.: US 9,963,615 B2
(45) Date of Patent: May 8, 2018

(54) AQUEOUS PIGMENT DISPERSION

(71) Applicants: Rohm and Haas Company, Philadelphia, PA (US); Dow Global Technologies LLC, Midland, MI (US)

(72) Inventors: Jonathan DeRocher, Coopersburg, PA (US); Kevin J. Henderson, Phoenixville, PA (US); Lidaris San Miguel Rivera, Midland, MI (US); Antony K. Van Dyk, Blue Bell, PA (US)

(73) Assignees: Dow Global Technologies LLC, Midland; Rohm and Haas Company, Philadelphia, PA (US)

( * ) Notice: Subject to any disclaimer, the term of this patent is extended or adjusted under 35 U.S.C. 154(b) by 1 day.

(21) Appl. No.: 15/370,119

(22) Filed: Dec. 6, 2016

(65) Prior Publication Data
US 2017/0166776 A1 Jun. 15, 2017

Related U.S. Application Data

(60) Provisional application No. 62/264,920, filed on Dec. 9, 2015.

(51) Int. Cl.
C09D 171/02 (2006.01)
C09D 17/00 (2006.01)

(52) U.S. Cl.
CPC ......... *C09D 171/02* (2013.01); *C09D 17/001* (2013.01); *C09D 17/002* (2013.01); *C09D 17/008* (2013.01)

(58) Field of Classification Search
None
See application file for complete search history.

(56) References Cited

U.S. PATENT DOCUMENTS

| 8,283,404 B2 | 10/2012 | Allen et al. |
| 8,865,827 B2 | 10/2014 | Henderson et al. |
| 8,907,004 B2 | 12/2014 | Henderson et al. |
| 2003/0108667 A1 | 6/2003 | McIntyre et al. |
| 2006/0111478 A1* | 5/2006 | Hommer ................ C04B 35/63 524/5 |
| 2009/0170989 A1 | 7/2009 | Steele et al. |
| 2014/0039115 A1 | 2/2014 | Henderson et al. |
| 2015/0175832 A1 | 6/2015 | Bohling et al. |
| 2016/0090502 A1 | 3/2016 | Van Dyk et al. |

FOREIGN PATENT DOCUMENTS

CN 103030730 * 4/2013

OTHER PUBLICATIONS

Machine translation of CN 103030730, Apr. 2013.*
Farrokhpay, Advances in Colloid and Interface Science, 151, pp. 24-32, 2009.*

* cited by examiner

*Primary Examiner* — Erma C Cameron
(74) *Attorney, Agent, or Firm* — Karl E. Stauss; Ronald D. Bakule

(57) ABSTRACT

The present invention relates to a stable aqueous pigment dispersion including: an aqueous medium, pigment particles, and from 0.1% to 15%, by weight based on the weight of pigment, of a certain first water-soluble polymer; and 2) a certain second water-soluble polymer; wherein the dispersant comprises a proportion of the first polymer to the second polymer of from 0.1:1 to 10:1 on a solids basis, and the first polymer and the second polymer are miscible in those proportions; and wherein the dispersant is substantially free of structural units of phosphorus acid monomers and their salts. The invention also relates to a method for forming the stable aqueous dispersion and a dry coating formed from the aqueous dispersion. The stable aqueous dispersion is useful, inter alia, for forming certain composite particles.

10 Claims, No Drawings

AQUEOUS PIGMENT DISPERSION

This invention relates to a stable aqueous pigment dispersion, a method for forming the stable aqueous pigment dispersion and a dry coating including the pigment particles. In particular, the invention relates to a stable aqueous pigment dispersion including: an aqueous medium, pigment particles, and from 0.1% to 15%, by weight based on the weight of pigment, of a dispersant, the dispersant including: (1) a first water-soluble polymer having an acid number of from 0 to 80 and a calculated Mn of from 450 Daltons to 10,000 Daltons; and 2) a second water-soluble polymer comprising, as copolymerized units, from 30% to 100% by weight, based on the weight of the second polymer sulfonic acid monomer, or a salt thereof; and from 0% to 10% by weight, based on the weight of the second polymer, carboxylic acid monomer, or a salt thereof; wherein the second polymer has a calculated Mn of from 1000 to 25,000 Daltons; wherein the dispersant comprises a proportion of the first polymer to the second polymer of from 0.1:1 to 10:1 on a solids basis, and the first polymer and the second polymer are miscible in those proportions; and wherein the dispersant is substantially free of structural units of phosphorus acid monomers and their salts. The invention also relates to a method for forming the stable aqueous dispersion and a dry coating formed from the aqueous dispersion.

US Patent Application Publication No. 2014/0039115 A1 discloses a stable aqueous dispersion of discrete polymer particles and a water-soluble dispersant adsorbed onto the surfaces of pigment particles, wherein the polymer particles comprise structural units of a sulfonic acid monomer or a salt thereof.

Opacifying coating manufacturers have long sought to formulate coatings having a desired opacity by maximizing the level of hiding while minimizing the amount of opacifying pigment utilized. One method to achieve this is to form composite particles with the pigment bearing a plurality of attached or associated water-insoluble polymer particles. However, in some embodiments, the use of dispersants including structural units of a sulfonic acid monomer or a salt thereof leads to higher than desirable viscosity and thixotropy of a pigment dispersion formed therefrom. This effect is undesirable in many instances. This effect is particularly undesirable for pigment dispersions to be used in the formation of select composite particles.

We have now found that these effects can be ameliorated by the use of dispersants including the sulfonic acid dispersants and certain additional water-soluble polymers without materially affecting their composite-forming efficacy.

According to a first aspect of the present invention there is provided a stable aqueous pigment dispersion comprising: an aqueous medium, pigment particles, and from 0.1% to 15%, by weight based on the weight of pigment, of a dispersant comprising: (1) a first water-soluble polymer having an acid number of from 0 to 80 and a calculated Mn of from 450 Daltons to 10,000 Daltons; and 2) a second water-soluble polymer comprising, as copolymerized units, from 30% to 100% by weight, based on the weight of said second polymer, sulfonic acid monomer, or a salt thereof; and from 0% to 10% by weight, based on the weight of said second polymer, carboxylic acid monomer, or a salt thereof; wherein said second polymer has a calculated Mn of from 1000 to 25,000 Daltons; wherein said dispersant comprises a proportion of said first polymer to said second polymer of from 0.1:1 to 10:1 on a solids basis, and said first polymer and said second polymer are miscible in said proportions; and wherein said dispersant is substantially free of structural units of phosphorus acid monomers and salts thereof.

According to a second aspect of the present invention there is provided a method comprising: dispersing pigment particles in an aqueous medium in the presence of from 0.1% to 15%, by weight based on the weight of pigment, of a dispersant comprising: (1) a first water-soluble polymer having an acid number of from 0 to 80 and a calculated Mn of from 450 Daltons to 10,000 Daltons; and 2) a second polymer comprising, as copolymerized units, from 30% to 100% by weight, based on the weight of said second polymer sulfonic acid monomer, or a salt thereof; from 0% to 10% by weight, based on the weight of said second polymer, carboxylic acid monomer, or a salt thereof; wherein said second polymer has a calculated Mn of from 1000 to 25,000 Daltons; wherein said dispersant comprises a proportion of said first polymer to said second polymer of from 0.1:1 to 10:1 on a solids basis, and said first polymer and said second polymer are miscible in said proportions; wherein said dispersant is substantially free of structural units of phosphorus acid monomers and salts thereof.

According to a third aspect of the present invention there is provided a dry coating formed by the method comprising: forming an aqueous coating composition comprising the stable aqueous dispersion of the first aspect of the present invention; applying said aqueous coating composition to a substrate; and drying, or allowing to dry, said aqueous coating composition.

The present invention relates to a stable aqueous dispersion including pigment particles. By "aqueous (medium)" herein is meant water and from 0% to 30%, by wt. based on the weight of the aqueous medium, of water-miscible compound(s). By a "stable aqueous dispersion" herein is meant an aqueous dispersion that passes the heat age stability test detailed in the Experimental Methods herein.

The stable aqueous pigment dispersion of the present invention includes pigment particles. By "pigment particles" herein is meant solid water-insoluble particles including pigment particles known in the coatings art as, for example, opacifying pigments, extenders, and particulate colorants; pigment particles may also be solid water-insoluble organic colorants. The pigment particles may be inorganic pigment particles, organic pigment particles, or mixtures thereof. The shape of the pigment particles is not important. Suitable shapes for the pigment particles include spherical shapes, such as a regular sphere, an oblate sphere, a prolate sphere, and an irregular sphere; cubic shapes such as a regular cube and a rhombus; plate-like shapes including a flat plate, a concave plate, and a convex plate; and irregular shapes. The pigment particles having spherical shapes typically have average diameters in the range of from 50 nm to 10 microns; pigment particles having nonspherical shapes typically have average diameters, defined as their maximum dimension, of from 50 nm to 10 microns. The average diameters of pigment particles are typically provided by pigment particle suppliers.

Of particular interest are inorganic pigment particles that are opacifying pigments. By "opacifying pigment" herein is meant that the particle engenders opacity when subject to light of a certain wavelength, not necessarily visible light. For example certain nanoparticles included herein provide opacity when subject to light of wavelengths lower than the visible range. The opacifying pigment particle has an average particle diameter of from 50 nm to 10 microns, preferably in the range of from 150 nm to 500 nm, and more preferably, in the range of from 200 nm to 350 nm. Pigment particles having nonspherical shapes preferably have average diameters, defined as their maximum dimension, of from 50 nm to 10 microns, more preferably of from 150 nm to 500 nm, and most preferably of from 200 nm to 350 nm. The opacifying pigment particles have an index of refraction [$n_D$ (20° C.)] of from 1.8 to 5.0. The indices of refraction for various materials are listed in CRC Handbook of Chemistry and Physics, 80th Edition, D. R. Lide, editor, CRC Press, Boca Raton, Fla., 1999, pages 4-139 to 4-146.

Suitable opacifying pigment particles include zinc oxide, antimony oxide, zirconium oxide, chromium oxide, iron oxide, lead oxide, zinc sulfide, lithopone, and forms of titanium dioxide such as anatase and rutile.

Preferably, the opacifying pigment particles are selected from titanium dioxide and lead oxide. More preferably, the pigment particles are selected from rutile titanium dioxide and anatase titanium dioxide. Most preferably, the opacifying pigment particles are rutile titanium dioxide. A coating containing two different forms of a material, such as rutile and anatase titanium dioxide, is considered to have two different pigments.

The opacifying pigment particles may have a uniform composition or a heterogeneous composition with two or more phases. Certain heterogeneous pigment particles have an inner core and surrounding shell structure wherein one type of pigment particle forms the core and another type of particle forms the shell. The core and shell heterogeneous pigment particles include core/shell particles having a shell completely or incompletely encapsulating the core; core/shell particles having more than one core; dipolar particles; and particles having multiple domains of one phase on the surface of the other phase. Pigment particles, such as titanium dioxide, may have at least one coating of one or more of silica, alumina, zinc oxide, and zirconia. For example, in certain embodiments titanium dioxide particles suitable for use in coatings of the present invention may have a coating of silica and a coating of alumina.

The pigment particles may be inorganic pigment particles known in the coatings art as extenders. Extender pigment particles have an index of refraction [$n_D$ (20° C.)] of from greater than 1.3 to less than 1.8. Typical extenders include, for example, magnesium silicate, calcium carbonate, aluminosilcates, silica, various clays such as kaolin and delaminated clay, and talc.

The pigment particles may be inorganic or organic colorant particles. Suitable inorganic colorant particles include, for example, iron oxide pigments such as goethite, lepidocrocite, hematite, maghemite, and magnetite; chromium oxide pigments; cadmium pigments such as cadmium yellow, cadmium red, and cadmium cinnabar; bismuth pigments such as bismuth vanadate and bismuth vanadate molybdate; mixed metal oxide pigments such as cobalt titanate green, chromate and molybdate pigments such as chromium yellow, molybdate red, and molybdate orange; ultramarine pigments; cobalt oxide pigments; nickel antimony titanates; lead chrome; blue iron pigments; carbon black; and metal effect pigments such as aluminum, copper, copper oxide, bronze, stainless steel, nickel, zinc, and brass; and mixtures thereof. Preferred inorganic colorant particles are iron oxide pigments; bismuth pigments; mixed metal oxide pigments; chromate and molybdate pigments; ultramarine pigments; cobalt oxide pigments; nickel antimony titanates; lead chrome; blue iron pigments; carbon black; metal effect pigments; and mixtures thereof.

The stable aqueous dispersion of the present invention includes a dispersant including: (1) a first water-soluble polymer having an acid number of from 0 to 80 and a calculated Mn of from 450 Daltons to 10,000 Daltons; and 2) a second water-soluble polymer comprising, as copolymerized units, from 30% to 100% by weight, based on the weight of the second polymer sulfonic acid monomer, or a salt thereof; and from 0% to 10% by weight, based on the weight of the second polymer, carboxylic acid monomer, or a salt thereof; wherein the second polymer has a calculated Mn of from 1000 to 25,000 Daltons; wherein the dispersant comprises a proportion of the first polymer to the second polymer of from 0.1:1 to 10:1 on a solids basis, and the first polymer and the second polymer are miscible in those proportions; and wherein the dispersant is substantially free of structural units of phosphorus acid monomers and their salts. In one embodiment the dispersant consists essentially of: (1) a first water-soluble polymer having an acid number of from 0 to 80 and a calculated Mn of from 450 Daltons to 10,000 Daltons; and 2) a second water-soluble polymer comprising, as copolymerized units, from 30% to 100% by weight, based on the weight of the second polymer sulfonic acid monomer, or a salt thereof; and from 0% to 10% by weight, based on the weight of the second polymer, carboxylic acid monomer, or a salt thereof; wherein the second polymer has a calculated Mn of from 1000 to 25,000 Daltons; wherein the dispersant comprises a proportion of the first polymer to the second polymer of from 0.1:1 to 10:1 on a solids basis, and the first polymer and the second polymer are miscible in those proportions; and wherein the dispersant is substantially free of structural units of phosphorus acid monomers and their salts. By "water-soluble" herein is meant that the polymer forms a clear solution in water at pH=8 at 25° C. at greater than 2% w/w, preferably at greater than 10% w/w, and most preferably at greater than 30% w/w. The Thixotropic Index of the aqueous pigment dispersion, as determined by the method in the Experimental Methods section herein, is preferably from 3.0 to 8.0, at 70-80 wt % solids.

The water-soluble first polymer has an acid number (the mass of KOH in mg that is required to neutralize one gram of polymer) of from 0 to 80, preferably from 0 to 40, and more preferably from 0 to 20, and a calculated Mn of from 450 Daltons to 10,000 Daltons. It is contemplated that that a water-soluble first polymer having an acid number of from 0 to 80 and a calculated Mn of from 100 Daltons to 449 Daltons will function in the present invention, but the lower calculated Mns may undesirably contribute to the VOC levels of coatings formed therefrom. A water-soluble first polymer having a calculated Mn greater than 10,000 Daltons is anticipated to lead to a pigment grind viscosity that is undesirably high. The water-soluble first polymer may be an addition polymer optionally including, as copolymerized units, hydroxyalkyl (meth)acrylates, alkoxyalkykyl (meth) acrylates and the like. The water-soluble first polymer may alternatively be a condensation polymer such as, for example, polyalkyleneoxides, alkyl ethers of polyalkylene oxides, and the like, and may optionally contain primary or secondary amine functionality, such as, for example, Jeffamine™ M 1000.

It is further contemplated that the water-soluble first polymer may be a water-dispersible polymer having an acid number of from 0 to 80 and a calculated Mn of from 500 Daltons to 10,000,000 Daltons. By "water dispersible" herein is meant that the water-dispersible first polymer is not water-soluble according to the definition hereinabove and that in a proportion of the first polymer to the second polymer of from 0.1:1 to 10:1, on a solids basis, the mixture is miscible in those proportions. Examples of water-dispersible first polymers are dispersions of insoluble particulate polymers such as emulsion polymers.

The second polymer includes, as copolymerized units, from 30% to 100% by weight, based on the weight of the polymer, sulfonic acid monomer, or a salt thereof and from 0% to 10% by weight, based on the weight of the polymer, carboxylic acid monomer, or a salt thereof. In some embodiments the second polymer optionally includes from 0% to 30% by weight, based on the weight of the polymer, monomer having water solubility greater than 1%. The second polymer is water-soluble and has a calculated Mn of from 1000 to 25,000 Daltons. The water-soluble second polymer preferably comprises at least 30%, more preferably at least 50%, to 100% more preferably to 80% by weight structural units of a sulfonic acid monomer or a salt thereof, based on the weight of the second polymer. Examples of suitable sulfonic acid monomers include 2-acrylamido-2-methylpropane sulfonic acid, vinyl sulfonic acid, 2-sulfoethyl acrylate, 2-sulfoethyl methacrylate, 3-sulfopropyl acrylate, 3-sulfopropyl methacrylate, sodium styrene sulfonate, and 2-propene-1-sulfonic acid, and salts thereof, and combinations thereof.

The second polymer may include, as copolymerized units, from 0% to 10% by weight, based on the weight of the polymer, carboxylic acid monomer, or a salt thereof; examples of carboxylic acid monomers include (meth) acrylic acid, maleic acid, itaconic acid and the like.

The second polymer may still further include, as copolymerized units, one or more nonionic co-monomers, examples of which include acrylates and methacrylates such as methyl methacrylate, ethyl acrylate, i-propyl methacrylate, butyl acrylate, and ethyl hexyl acrylate; other examples of suitable monomers include styrene and substituted styrenes, butadiene, and the like.

In the present invention the "calculated $M_n$" of the first water-soluble polymer is from 450 Daltons to 10,000 Daltons, preferably from 2,000 Daltons to 10,000 Daltons and the "calculated $M_n$" of the second water-soluble polymer is from 1,000 Daltons to 25,000 Daltons, preferably from 2,000 Daltons to 10,000 Daltons. "Calculated $M_n$" herein is defined as that determined by the following calculation (The Chemistry of Radical Polymerization, G. Moad and D. Solomon, Elsevier, 2006; Polymer Handbook, J. Brandrup and E. H. Immergut, Wiley, 1989)

$$\frac{1}{DP_n} = C_T \frac{[CTA]}{[M]} + C_I \frac{[I]}{[M]}$$

where $DP_n$ is the degree of polymerization; [M], [CTA], and [I] are the molar amounts of monomer, chain transfer agent, and initiator, respectively; $C_T$ is the CTA transfer efficiency taken as 0.62 herein, and $C_I$ is the initiator efficiency, taken as 0.5 herein. The $M_n$ is calculated as $$M_n = DP_n \times \sum m_i [M_i]$$

where $m_i$ is the molar mass of monomer i and $[M_i]$ is the molar fraction of monomer i.

The dispersant includes a proportion of the first polymer to the second polymer of from 0.1:1 to 10:1, preferably from 1:1 to 5:1, on a solids basis, and the first polymer and the second polymer are miscible in those proportions. By "miscible in those proportions" is meant herein that those mixtures form a homogeneous solution in those proportions at 25° C.; further, also that those mixtures form a homogeneous solution in an aqueous medium at 25° C. at a level of from 10% to 90% on a weight basis.

The dispersant is substantially free of structural units of phosphorus acid monomers and salts thereof. By "substantially free of structural units of phosphorus acid monomers and salts thereof" is meant herein that the dispersant has less than 0.1 weight %, more preferably less than 0.01 weight %, and most preferably 0 weight % structural units of a phosphorus acid monomer such as a phosphoalkyl (meth)acrylate or a salt thereof.

The dispersant preferably has a solution viscosity in water at 25° C. at 30 wt % solids of from 0.1 Pa·s to 3.0 Pa·s.

In the method of the invention a pigment particle is dispersed in an aqueous medium in the presence of from 0.1% to 15%, preferably from 0.20% to 10%, more preferably from 0.25% to 5%, and most preferably from 0.3% to 2%, by weight based on the weight of pigment, of a dispersant including: (1) a first water-soluble polymer having an acid number of from 0 to 80 and a calculated Mn of from 450 Daltons to 10,000 Daltons and 2) a second water-soluble polymer including, as copolymerized units, from 30% to 100% by weight, based on the weight of the second polymer, sulfonic acid monomer, or a salt thereof and from 0% to 10% by weight, based on the weight of the second polymer, carboxylic acid monomer, or a salt thereof; wherein the second polymer has a calculated Mn of from 1000 to 25,000 Daltons; wherein the dispersant comprises a proportion of the first polymer to the second polymer of from 0.1:1 to 10:1 on a solids basis, and the first polymer and the second polymer are miscible in those proportions; wherein the dispersant is substantially free of structural units of phosphorus acid monomers and salts thereof.

The dispersion step may be effected by any means commonly used to disperse pigments in an aqueous medium, including, for example, grinding with a high speed dispersator, or grinding in media mills or ball mills.

In any event the pigment dispersion must have sufficient stability during storage (substantially maintaining the same particle size with no or minimal sediment formation) and must have sufficient stability to withstand aggregation and coagulation during any optional subsequent step of contacting the dispersed pigment particle with an aqueous dispersion of polymer particles.

In some embodiments of the present invention at least some of the pigment particles bearing the water-soluble polymer have disposed thereon a plurality of water-insoluble polymer particles; this is the structure referred to herein as a "composite particle". The water-insoluble polymer particles are typically prepared by emulsion polymerization in an aqueous medium. The average particle diameter of such emulsion polymer particles is typically from 40 nm to 1000 nm, preferably from 40 nm to 500 nm, more preferably from 60 nm to 300 nm. Particle sizes herein are those measured by dynamic light scattering using a Brookhaven BI-90 analyzer. The emulsion polymer particles are preferably predominantly anionically stabilized and include anionic or nonionic, or both, surfactant. The emulsion polymer particles may be monodisperse or polydisperse or bimodal with respect to particle size, and may consist of one or more different types, compositions, and particle sizes. The emulsion polymer glass transition temperature ("$T_g$"), herein is that calculated by the Fox equation [*Bulletin of the American Physical Society* 1, page 123 (1956)] and may range from −20° C. to 60° C. and may in some embodiments consist of blends of particles of different $T_g$s, in which case the overall polymer composition is used herein in calculating the $T_g$. The emulsion polymer particles may optionally contain crosslinker that may be uniform, staged, or employed in seed particles. Examples of suitable emulsion polymer compositions include polymers, named for their predominant monomer constitution, include acrylic-, vinyl-acrylic-, styrene-acrylic, vinyl acetate/ethylene-, urethane-, melamine-, epoxy-, alkyd-, acrylonitrile-, styrene-, polybutadiene-, polyisoprene-, ethylene-propylene-, polyvinyl alcohol-, vinyl chloride-, vinylidene chloride-, epoxy-based homopolymers and copolymers, and blends of such compositions. The polymer particles are present in the composite particles at levels ranging from 2% to 50% by weight, based on the total dry weight of the composite particles.

In some embodiments of the method of the present invention the dispersed pigment particles are contacted with an aqueous dispersion of water-insoluble polymer particles in an amount of from 2% to 300% by weight, based on the weight of the resultant composite particles, to form composite particles. This step is typically conducted with low shear mixing, preferably for a period of less than 60 minutes at a temperature of the aqueous dispersion of from 5° C. to 50° C.

By "composite particles" herein is meant particles including at least one water-insoluble pigment particle, the dispersant, and a plurality of water-insoluble polymeric particles. The composite particles typically include at least one pigment particle, at least some of the dispersant adsorbed on or associated with the pigment surface, and a plurality of polymer particles disposed thereon. Typically a predominant amount of the composite particles include only one pigment particle. Preferably >80%, more preferably >90%, and most preferably >95%, by number, of the composite particles include only one pigment particle. However, structures including more than one pigment particle are also contemplated; in that event the pigment particles may be the same or different.

An aqueous coating composition including such composite particles may also include one or more of pigment particles not incorporated in composite particles and polymer particles, the same as or different from the polymer particles incorporated into the composite particles. The aqueous coating composition optionally additionally includes other materials commonly found in coatings such as opaque polymer particles, such as, for example, extenders, other polymers, hollow sphere, when dry, pigments such as Ropaque™ Opaque Polymers (Dow Chemical Co.), solvents, coalescents at a level of from 0 to 40 wt %, based on the weight of polymer solids, wetting agents, defoamers, rheology modifiers, crosslinkers, dyes, pearlescents, adhesion promoters, leveling agents, optical brighteners, ultraviolet stabilizers, preservatives, biocides, and antioxidants.

In one aspect of the present invention a dry coating is formed by the method including: (a) forming an aqueous coating composition including the stable aqueous pigment dispersion; (b) applying the aqueous coating composition to a substrate; and (c) drying, or allowing to dry, the aqueous coating composition. The aqueous coating composition herein expressly includes compositions known in the art as architectural, maintenance, and industrial coatings, caulks, sealants, and adhesives. Aqueous coating compositions include, for example, paint formulations, automotive coatings formulations, architectural and industrial coatings formulations, caulks and sealants, adhesives, inks, paper coatings; coatings and saturants for textiles and nonwovens; adhesives; powder coatings; and traffic paints such as those paints used to mark roads, pavements, and runways. The aqueous coating composition also includes compositions such as, for example, cosmetic formulations, dentifrices, and hand lotions that are not used to form dry coatings of the invention. The aqueous coating composition is typically applied to a substrate such as, for example, wood, metal, plastic, paper and board, leather, marine and civil engineering substrates, cementitious substrates such as, for example, concrete, stucco, and mortar, previously painted or primed surfaces, and weathered surfaces. The aqueous coating composition may be applied to a substrate using conventional coatings application methods such as, for example, brush, roller, caulking applicator, roll coating, gravure roll, curtain coater and spraying methods such as, for example, air-atomized spray, air-assisted spray, airless spray, high volume low pressure spray, and air-assisted airless spray. Drying of the aqueous coating composition to provide a dry coating may be allowed to proceed under ambient conditions such as, for example, at from 5° C. to 35° C. or the coating may be dried at elevated temperatures such as, for example, from 35° C. to 150° C.

The examples that follow illustrate aspects of the present invention. The abbreviation "g" represents "grams".

Abbreviations:
AMPS=2-acrylamido-2-methylpropane sulfonic acid
HPA=hydroxypropyl acrylate
AA=acrylic acid
MPEG=methoxypolyethylene glycol Test Methods Stable Aqueous Compositions:

Samples of the aqueous compositions were made, divided, and filled into 250 ml containers. Viscosity was measured at 25° C. with a BYK KU-2 Stormer type viscometer (BYK-Gardner GmbH, Lausitzer Strasse 8, 82538 Geretsried, Germany, Tel +49 8171 3493-0) and measurements made according to ASTM D562. Initial measurements were made within 2 hr of batch completion; 1-day measurements were made after equilibrating the samples at 25° C. for 1 day; 10-day measurements were made after equilibrating the samples at 25° C. for 10 days; and heat age measurements were made after storing the samples at 60° C. for 10 days followed by adjustment to 25° C. for measurement. The final value of viscosity rise, $\Delta KU$, is given by the difference between the heat age measurement, and the initial measured viscosity. "Stable aqueous dispersions" herein are those that have $\Delta KU$ less than 10 KU.

Polymer Water Solubility:

"Water solubility" herein refers to a polymer forming a clear solution in water at pH ~8 at 25° C. at greater than 10% w/w, preferably at greater than 20% w/w, and most preferably at greater than 30% w/w.

Thixotropic Index Determination

The Thixotropic Index ("T.I.") is determined herein using a Brookfield DV II viscometer and a No. 4 Spindle. The T.I. is the ratio of the viscosity determined at 6 rpm divided by the viscosity determined at 60 rpm. Repeated batches and repeated measurements found that the error is +/−0.1

Adsorption Centrifugation Test Method for Degree of Composite Formation

DI water (24.59 g) was added to each composite mixture (15.41 g) and mixed on a roller at 15 rpm for 15 min. Each sample was then centrifuged at 7000 rpm at 25.degree. C. for 15 min using a Sorvall Legend X1R centrifuge equipped with a Fiberlite F15-8x50cy fixed-angle rotor. The percent solids of the supernatant of each sample was determined by pipetting approximately 3 g of solution into a tared aluminum dish and drying in a 105° C. oven for 1 hr and recording the dried weight of the sample. The amount of latex adsorption was calculated using the following equation:

$$Ad(\%)=[1-(W_{f,s}/W_{i,s})/(W_{f,c}/W_{i,c})]\times 100\%$$

where $W_{i,s}$ is the initial weight of the sample supernatant, $W_{f,s}$ is the final weight of the dried sample supernatant, $W_{i,c}$ is the initial weight of the control supernatant, and $W_{f,c}$ is the final weight of the dried control supernatant.

EXAMPLE 1 AND COMPARATIVE EXAMPLES A-C

Samples of DuPont TiPure™ R-706 TiO$_2$ slurry at 75.0%w/w were prepared using the following dispersants.

Example 1

Dispersant a: second polymer, AMPS/HPA/AA copolymer (Dispersant b)+12% w/w with first polymer, MPEG 550 (calculated Mn=550) 28% w/w (total solids 40% w/w). The first polymer and the second polymer were miscible together in all proportions; they formed a clear solution with no phase separation or sediment after 6 months at 25° C.

Comparative Example A

Dispersant b: AMPS/HPA/AA copolymer; less than 10 wt % copolymerized carboxylic acid monomer; from 30 wt % to 100 wt % copolymerized sulfonic acid monomer; Acid No. =193 mg KOH/g polymer.

Comparative Example B

Dispersant c: copolymer of AMPS/Dibutylamino-polyethyleneoxide(4)-methacrylate

Comparative Example C

Dispersant d: copolymer of AMPS/Dibutylamino-polyethyleneoxide(4)-methacrylate (Mw=480) of the same mole ratios as Dispersant b, replacing HPA with PEGMA.

TABLE 1.1

Pigment Dispersion Compositions

| Material Name | Ex. 1 grams | Comp. A grams | Comp. B grams | Comp. C grams |
|---|---|---|---|---|
| Water | 16.86 | 17.86 | 15.86 | 17.86 |
| Dispersant a | 2.53 | | | |
| Dispersant b | | 0.75 | | |
| Dispersant c | | | 1.07 | |
| Dispersant d | | | | 1.07 |
| AMP-95 | 0.20 | 0.20 | 0.20 | 0.20 |

TABLE 1.1-continued

Pigment Dispersion Compositions

| Material Name | Ex. 1 grams | Comp. A grams | Comp. B grams | Comp. C grams |
|---|---|---|---|---|
| Ti-Pure™ R-706 | 75.00 | 75.00 | 75.00 | 75.00 |
| Water | 5.41 | 6.19 | 7.87 | 5.87 |
| Totals | 100.00 | 100.00 | 100.00 | 100.00 |

The pigment was dispersed with SpeedMixer™ (FlackTek Inc.) DAC 150 FVZ at 2,200 rpm for 4 minutes. The samples were equilibrated to 25° C. overnight and viscosity measured on a Brookfield viscometer at selected rpm.

The aqueous dispersions were stable according to the test method herein. Further, the dispersions of Example 1 and Comparative Example A were stable to greater than 6 months at 25° C.

TABLE 1.2

Determination of Thixotropic Index

| Sample | 4/6* | 4/12* | 4/60* | T.I. |
|---|---|---|---|---|
| Ex. 1 | 8900 | 4750 | 1140 | 7.8 |
| Comp. A | 7200 | 3050 | 780 | 9.2 |
| Comp. B | 10100 | 4900 | 1220 | 8.3 |
| Comp. C | 25300 | 13100 | 3030 | 8.3 |

*Brookfield DV II spindle # and rpm. Measurements shown in cP
T.I is the thixotropic index, the ratio of cP at 6 divided by the cP at 60 rpm.
Repeated batches and repeated measurements found that the error is +/−0.1

Composite formation by contacting the dispersed pigment particles with an aqueous dispersion of water-insoluble polymer particles in an amount of from 5% to 300% by weight, based on the weight of the composite particles provided a viscosity increase in the composite premix and the hiding via S/mil of the coatings were equivalent within experimental error.

Example 1 of the invention provides a desirably lower thixotropic index relative to that of Comparative Examples A-C

EXAMPLE 2 and COMPARATIVE EXAMPLE D

TiPure™ R-706 TiO$_2$ was dispersed at 73 wt % pigment with either Dispersant a (Example 2) or with Dispersant b (Comparative Example D), as identified in Example 1 above, and contacted with three different aqueous dispersions of water-insoluble polymer particles at PVC=40. The low shear (Brookfield) viscosity (Spindle 4, 6 rpm) was measured at each time point. In addition, aliquots of each premix were diluted and centrifuged to determine the amount of latex adsorbed to TiO$_2$ according to the Adsorption Centrifugation Test Method for Degree of Composite Formation test method provided herein.

TABLE 2.1 degree of composite formation

| | Time (min) | BF Viscosity (cP) | | Free Latex | | Composite Formation | |
|---|---|---|---|---|---|---|---|
| | | Disp. b | Disp. a | Disp. b | Disp. a | Disp. b | Disp. a |
| PRIMAL™ AC-6501 | 10 | 310 | 246 | 75.88% | 81.10% | 25.15% | 19.71% |
| | 45 | 826 | 692 | 63.17% | 69.38% | 38.39% | 31.92% |
| | 240 | 4210 | 3600 | 51.62% | 53.72% | 50.44% | 48.25% |
| | 1440 | 10000 | 10000 | 40.06% | 41.79% | 62.49% | 60.68% |

TABLE 2.1-continued degree of composite formation

| | | BF Viscosity (cP) | | Free Latex | | Composite Formation | |
|---|---|---|---|---|---|---|---|
| | Time (min) | Disp. b | Disp. a | Disp. b | Disp. a | Disp. b | Disp. a |
| RHOPLEX ™ SG-30 | 10 | 404 | 350 | 90.47% | 93.08% | 6.37% | 4.63% |
| | 45 | 640 | 576 | 86.36% | 90.63% | 9.12% | 6.26% |
| | 240 | 1020 | 1220 | 79.94% | 81.27% | 13.41% | 12.52% |
| | 1440 | 1310 | 1210 | 69.66% | 64.88% | 20.28% | 23.48% |
| RHOPLEX ™ VSR-50 | 10 | 850 | 818 | 87.08% | 88.13% | 14.49% | 13.31% |
| | 45 | 1460 | 1140 | 84.30% | 85.76% | 17.60% | 15.96% |
| | 240 | 3430 | 2320 | 79.95% | 81.83% | 22.47% | 20.37% |
| | 1440 | 3860 | 2020 | 70.33% | 72.86% | 33.26% | 30.42% |

PRIMAL ™ and RHOPLEX ™ are trademarks of the The Dow Chemical Company

Example 2 of the invention provides a substantially equivalent degree of composite formation relative to that of Comparative Example D.

We claim:

1. A stable aqueous pigment dispersion comprising:
a pigment particle and a dispersant comprising: (1) a first water-soluble polymer having an acid number of from 0 to 80 and a calculated Mn of from 450 Daltons to 10,000 Daltons; and 2) a second water-soluble polymer comprising, as copolymerized units, from 30% to 100% by weight, based on the weight of said second polymer, sulfonic acid monomer, or a salt thereof; and from 0% to 10% by weight, based on the weight of said second polymer, carboxylic acid monomer, or a salt thereof; wherein said second polymer has a calculated Mn of from 1000 to 25,000 Daltons; wherein said dispersant comprises a proportion of said first polymer to said second polymer of from 0.1:1 to 10:1 on a solids basis, and said first polymer and said second polymer are miscible in said proportions; and wherein said dispersant is substantially free of structural units of phosphorus acid monomers and salts thereof.

2. The stable aqueous dispersion of claim 1 wherein said pigment particle is an inorganic pigment particle comprising $TiO_2$, said pigment particle having an average particle diameter of from 0.05 microns to 10 microns.

3. The stable aqueous dispersion of claim 1 wherein the acid number of said first water-soluble polymer is from 0 to 40.

4. The stable aqueous dispersion of claim 1 wherein said pigment particle has disposed thereon a plurality of water-insoluble polymer particles in an amount of from 2% to 50% by weight, based on the weight of the resultant composite particles.

5. A method comprising:
dispersing a pigment particle in an aqueous medium in the presence of from 0.1% to 15%, by weight based on the weight of pigment, of a dispersant comprising: (1) a first water-soluble polymer having an acid number of from 0 to 80 and a calculated Mn of from 450 Daltons to 10,000 Daltons; and 2) a second water-soluble polymer comprising, as copolymerized units, from 30% to 100% by weight, based on the weight of said second polymer sulfonic acid monomer, or a salt thereof and from 0% to 10% by weight, based on the weight of said second polymer, carboxylic acid monomer, or a salt thereof; wherein said second polymer has a calculated Mn of from 1000 to 25,000 Daltons; wherein said dispersant comprises a proportion of said first polymer to said second polymer of from 0.1:1 to 10:1 on a solids basis, and said first polymer and said second polymer are miscible in said proportions; wherein said dispersant is substantially free of structural units of phosphorus acid monomers and salts thereof.

6. The method of claim 5 further comprising: contacting said dispersed pigment particle with an aqueous dispersion of water-insoluble polymer particles in an amount of from 2% to 300% by weight, based on the weight of the resultant composite particles.

7. The method of claim 6 wherein said contacting is conducted for a period of less than 60 minutes at a temperature of from 5° C. to 50° C.

8. The method of claim 5 wherein the acid number of said first water-soluble polymer is from 0 to 40.

9. The method of claim 6 wherein the acid number of said first water-soluble polymer is from 0 to 40.

10. A dry coating formed by the method comprising:
a) forming an aqueous coating composition comprising the stable aqueous dispersion of claim 1 or claim 2 or claim 3 or claim 4;
b) applying said aqueous coating composition to a substrate; and
c) drying, or allowing to dry, said aqueous coating composition.

* * * * *